July 20, 1965 A. ZUNICH 3,195,340
METHOD AND APPARATUS FOR TOLERANCE TRIMMING
AND PIERCING WORKPIECES
Filed Sept. 11, 1961 8 Sheets-Sheet 4

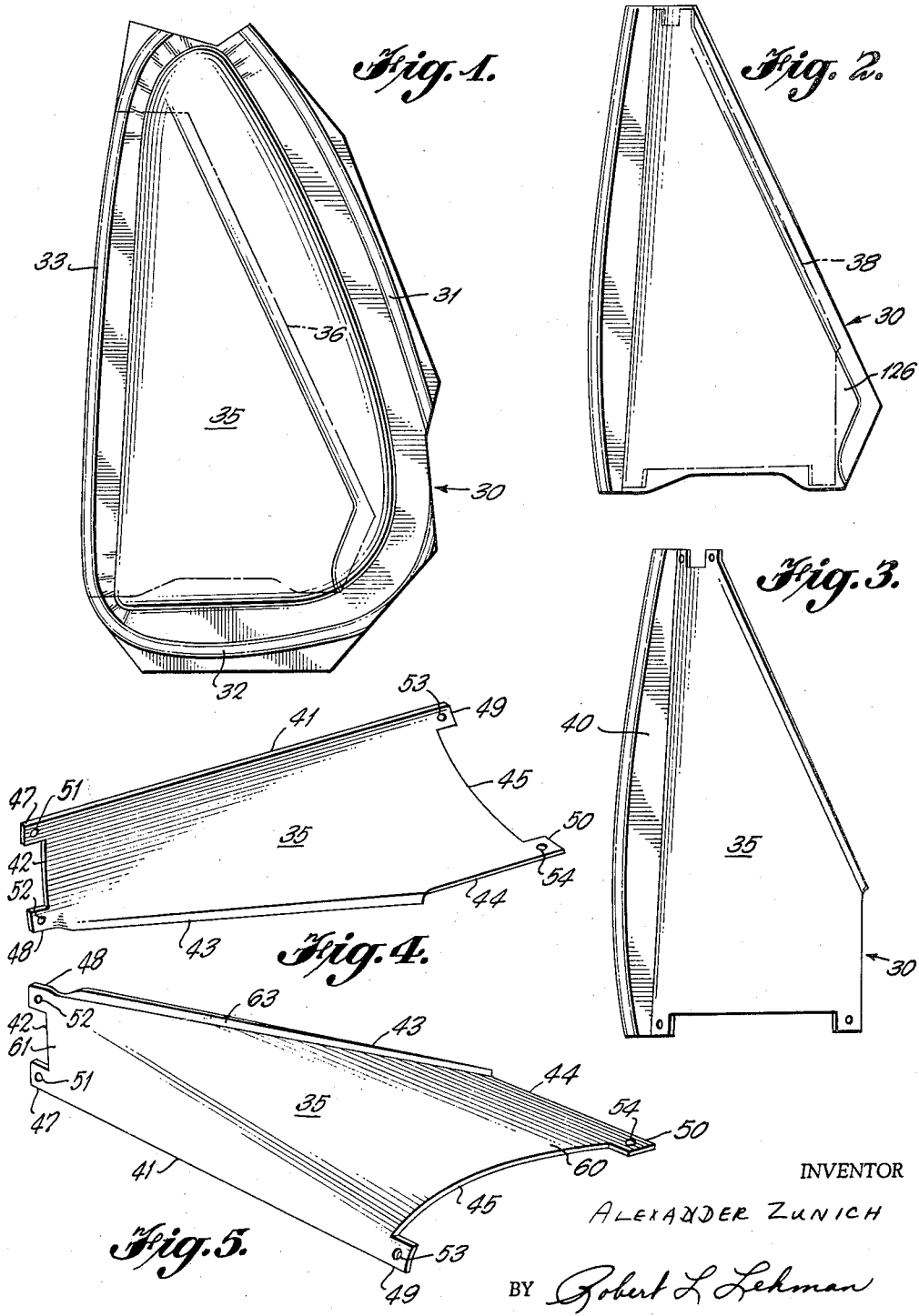

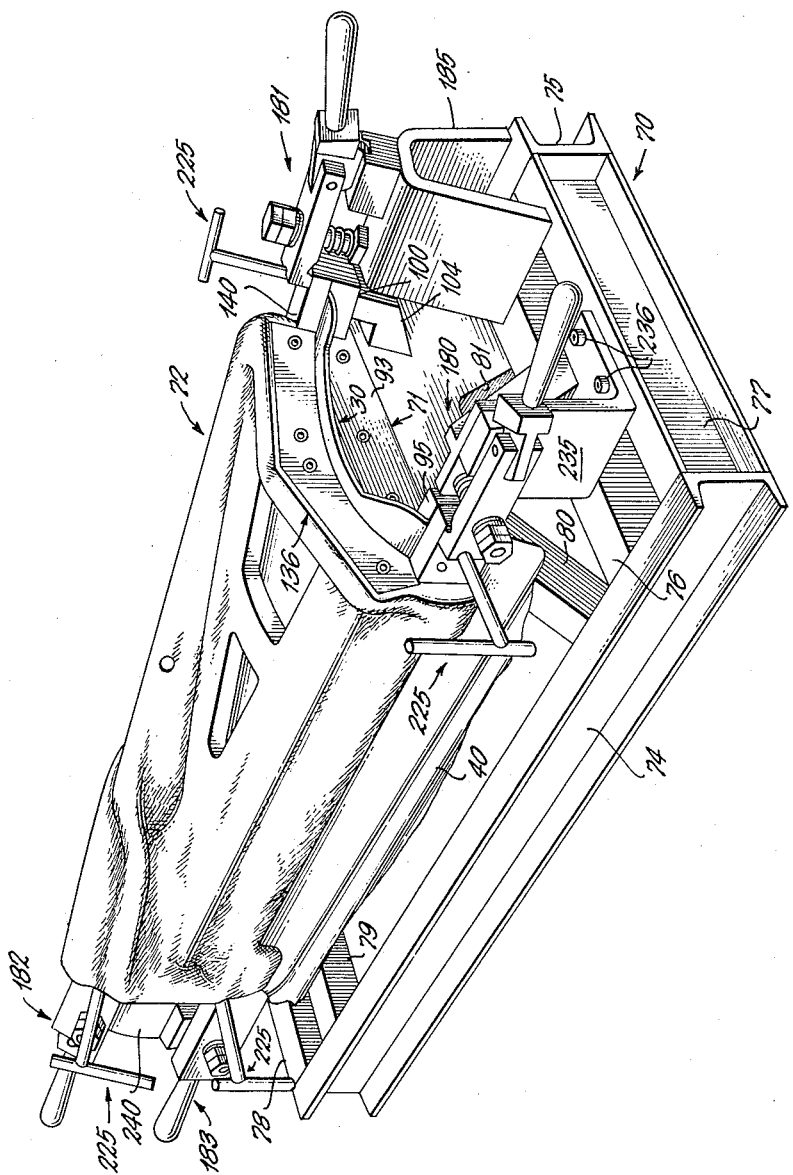

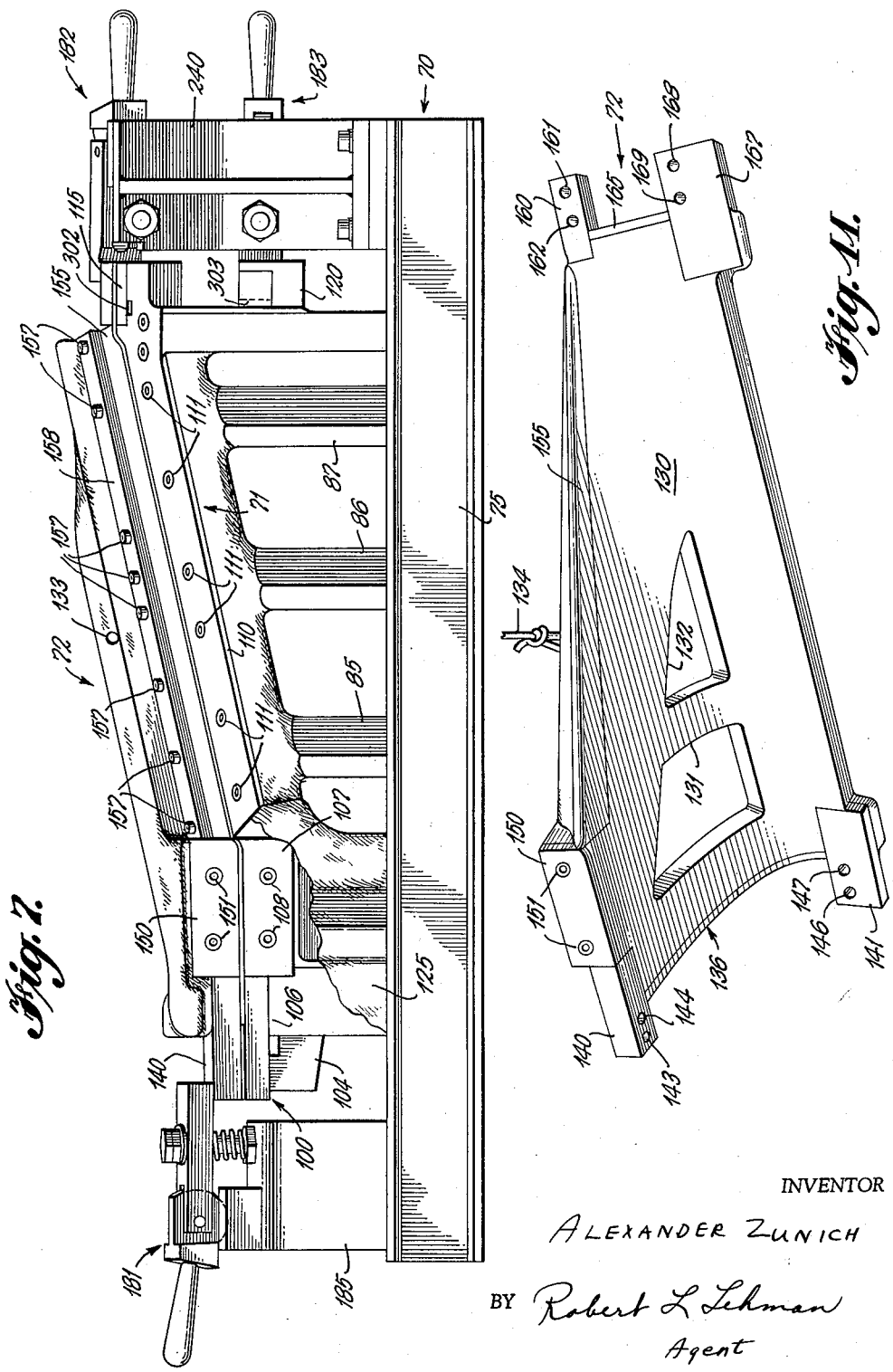

INVENTOR
ALEXANDER ZUNICH
BY Robert L. Lehman
Agent

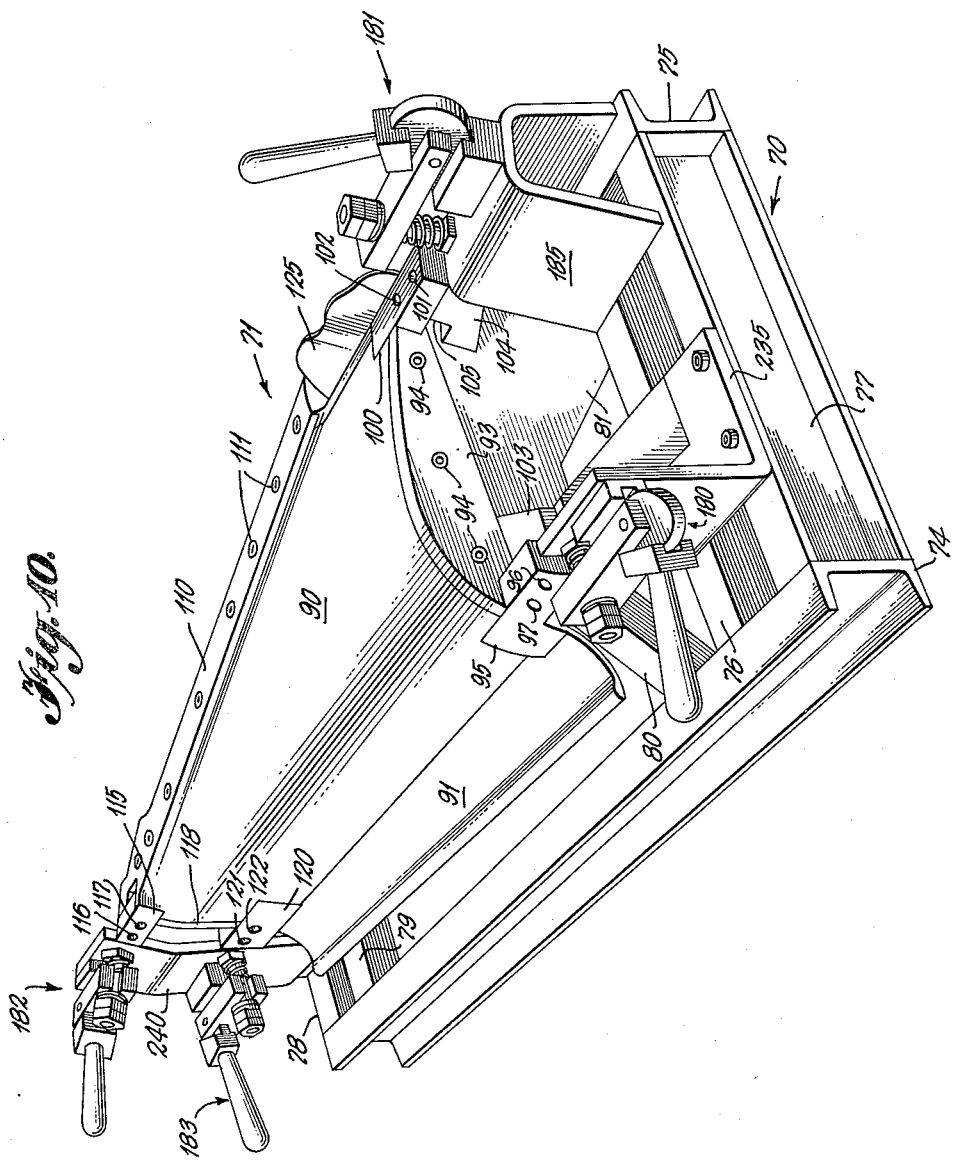

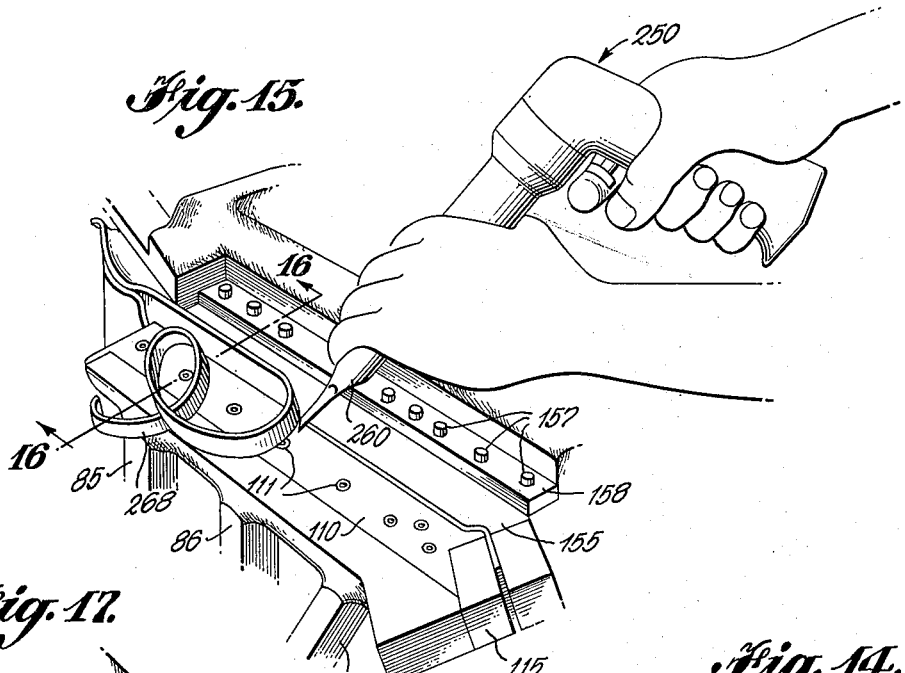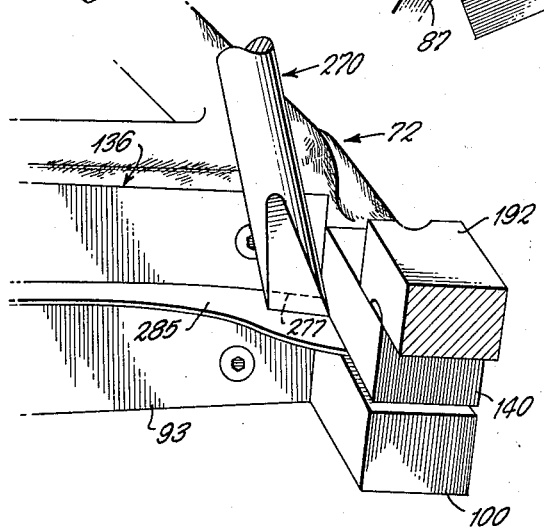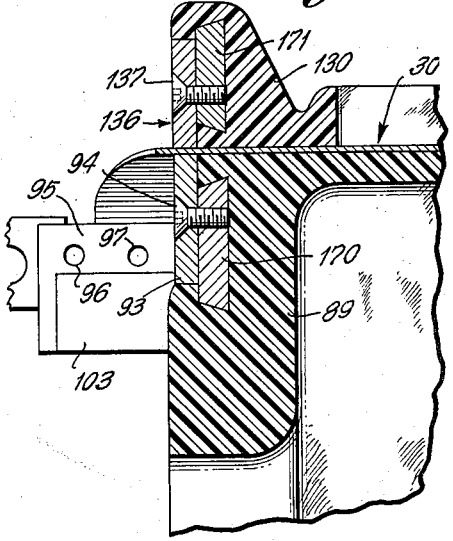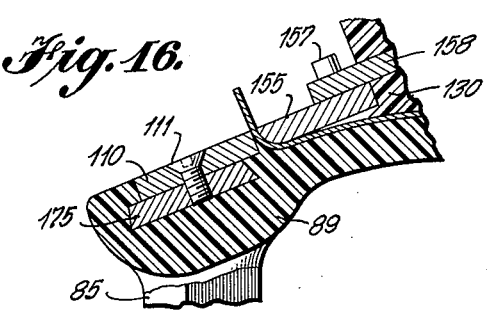
INVENTOR
ALEXANDER ZUNICH
BY Robert L. Lehman
Agent

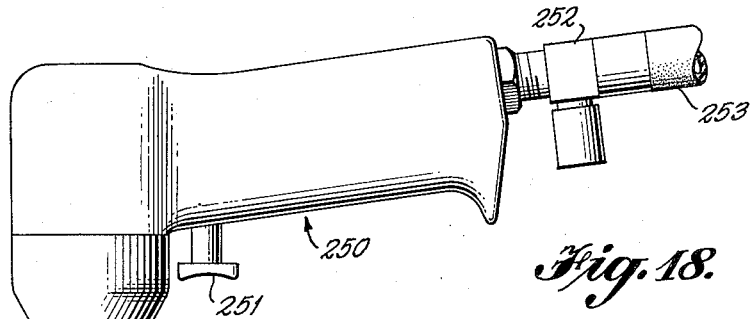
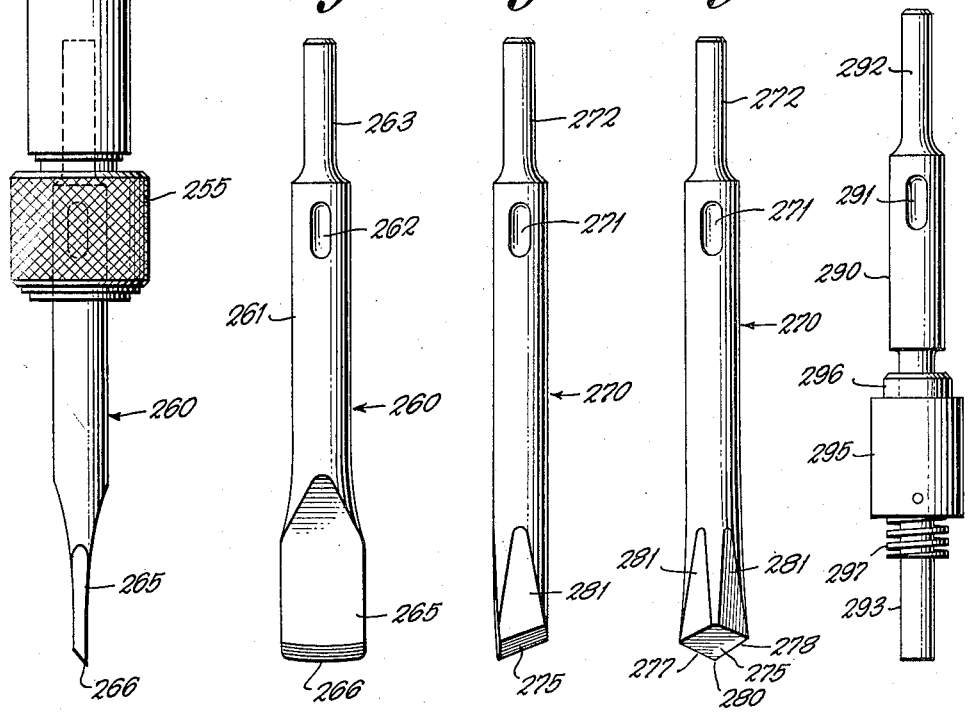
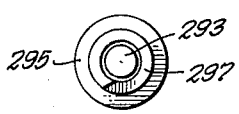
INVENTOR
ALEXANDER ZUNICH
BY Robert L. Lehman
Agent

United States Patent Office 3,195,340
Patented July 20, 1965

3,195,340
METHOD AND APPARATUS FOR TOLERANCE TRIMMING AND PIERCING WORKPIECES
Alexander Zunich, Lincolnwood, Ill., assignor to National Lead Company, New York, N.Y., a corporation of New Jersey
Filed Sept. 11, 1961, Ser. No. 137,388
9 Claims. (Cl. 72—338)

The present invention relates to a new and novel method and apparatus for tolerance trimming and piercing workpieces employing a novel trimming and piercing fixture apparatus and manually operated cutting and piercing tools.

The present invention has its primary application in the trimming of excess material from stampings and the like. In the formation of stampings of compound shape with the use of forming dies, it is necessary to provide an original sheet of material which is substantially larger than the finished workpiece since the additional material is required for restraining the flow of the sheet of material into the dies. This results in what is commonly referred to as overstock which actually represents excess material which extends laterally beyond the desired finished outer dimension of the workpiece.

Accordingly, after having stamped out the desired configuration, it is necessary to remove the overstock, and the present invention is particularly directed to the removal of this overstock and the piercing of the workpiece. It should be noted that the trimming operation is usually proportionally more difficult with the complexity of the shape of the workpiece, and the trimming operation becomes quite difficult when compound curvatures are involved.

It is important to keep in mind that the present invention relates to tolerance trimming, and in many applications, the trimmed outer edges of the finished workpiece must be within a 0.010 inch tolerance.

In prior art methods, two common modes of trimming off overstock from stampings have been employed depending primarily upon the number of workpieces which it is desired to trim. In high production runs where large numbers of workpieces are to be trimmed, automatic trim and pierce dies are employed. When trimming workpieces of complex shape having multiple curvatures, it is necessary to either employ a multiplicity of trim dies or a cam die arrangement. Either of these conventional high production type mechanisms is very expensive, and accordingly, it is only economical to employ this type of mechanism where a very large number of workpieces is involved.

On the other hand, in prototype work and low-production runs of a relatively limited number of workpieces, it is completely economically unfeasible to employ automatic conventional trim and pierce dies, and accordingly, the trimming of workpieces in such instances is carried out manually.

In conventional manual trimming operations, the workpieces, of course, are formed from a sheet of material whereupon the outer finished dimensions of the workpiece are carefully scribed from a template upon the sheet of material as it comes from the stamping machine. Firstly, the sheet of material is rough cut by means of a band saw and the like whereupon the piece is hand-trimmed with metal snips or similar apparatus.

The workpiece is then brought down to its final desired finished dimension by hand filing exactly to the line which is scribed on the sheet of material. It is apparent that this requires very skillful filing and is a time-consuming matter even for the most skilled personnel since the workpiece must often be brought within a tolerance of 0.010 inch or less.

A particularly disadvantageous feature of the aforementioned manual trim method employed in the art is the fact that personnel will now and then inadvertently file beyond the scribed line on the material, and when this happens, the piece is usually ruined for the intended purpose such that it must be discarded. This, of course, represents a great economic loss since not only is there a substantial loss in labor, but also the material must be discarded. The loss in material in this instance is substantial since the workpiece may be of relatively large dimension and may be formed of body steel, "Inconel," or stainless steel or the like.

The present invention is particularly useful in trimming off overstock from stampings having compound curvatures wherein the number of workpieces to be trimmed is somewhere intermediate the number involved in the two aforementioned prior art methods. If there is a very large number of workpieces to be trimmed, it may be more economical to employ automatic and relatively expensive conventional trim and pierce dies. On the other hand, if only a very few workpieces are to be trimmed, it may be more economical to perform the trimming operation by the aforementioned manual process.

The present invention, therefore, is particularly applicable where the number of workpieces to be trimmed does not justify the cost of automatic trim and pierce dies, and where on the other hand the number of workpieces to be trimmed is such that the savings over the conventional manual trimming method are substantial.

As a typical example, if the trimming of a workpiece such as a dashboard of an automobile is involved, automatic trim and pierce dies would generally be employed where several hundred thousand of the workpieces are produced. On the other hand, if the work is primarily of a prototype nature and only five or ten of the items are to be produced, the prior art manual method would probably be employed. However, if it is desired to trim hundreds of workpieces, the present invention would provide the preferred manner of trimming and piercing.

In the present invention, a trimming and piercing fixture is employed which includes separate parts which are adapted to clamp the drawn sheet of material therebetween, the separate parts of the trimming fixture having trimming edge portions thereon defining portions of the desired finished outer dimension of the workpiece to tolerance.

A cutting tool is provided which is adapted to move along the trimming edge portions of the trimming fixture cutting off the overstock as it moves along these trimming edge portions. Since the trimming edge portions define the outer dimensions of the workpiece to tolerance, the workpiece will thereby be automatically trimmed to the required tolerance, and a particular advantage of the invention is the fact that it is virtually impossible for the person carrying out the process to cut off an excessive amount of material such that the workpiece would be ruined.

The fixture also provides a means for guiding a piercing tool in such a manner that the workpiece can be readily pierced in the proper locations.

The trimming and piercing method of the present invention represents a major improvement over each of the aforediscussed prior art methods. Firstly, the present method represents a very substantial saving in cost as compared to the utilization of automatic trimming and piercing dies since the trimming and piercing fixture of the present invention can be manufactured for a fraction of the cost of the prior art high production trimming and piercing dies.

On the other hand, the present invention also represents a great improvement over the prior art manual trimming method in a number of respects. The method of the present invention can be carried out much more quickly than the prior art manual method since in the first place, it is not necessary to carefully scribe lines on the stamped material which indicate the exact finished outer dimensions of the workpiece. Secondly, the person carrying out the trimming method does not have to very tediously and carefully file down the material to the line while all the time worrying about going slightly over the line and ruining the workpiece. In fact, the person carrying out the present method need not have any particular skill since the method is fool-proof and it is practically impossible to ruin the workpiece. All that is required is to move the cutting tool along the trimming edge portions of the fixture, and the workpiece is thereby automatically trimmed to the desired tolerance.

The present invention also provides a maximum degree of flexibility and maneuverability since the workpiece is held in place in the fixture and the person carrying out the process can readily manually maneuver the cutting tool in many different directions and angles as required with the most complex workpiece shapes including compound curvature.

This flexibility may be further enhanced by providing a means for movably mounting the fixture such that access can be gained more readily to different portions thereof.

The novel method as defined above employs the aforementioned fixture apparatus in conjunction with certain novel tools particularly adapted to carry out the desired functions. Firstly, a novel manually operated power driven cutting tool is provided for trimming along the trimming edge portions of the fixture. Additionally, a special tool may be provided for cutting corners where required in the workpiece. Further, a novel piercing tool is provided which cooperates with the aforementioned guide means formed on the fixture for accurately guiding the piercing tool so that openings will be pierced in the exact proper locations in the workpiece.

An object of the present invention is to provide a new and novel method for tolerance trimming and piercing workpieces which can be carried out much more quickly and easily than prior art manual methods.

Another object of the invention is the provision of a method for tolerance trimming workpieces which is foolproof and prevents the workpiece from being ruined while trimming thereby eliminating loss of both material and labor.

A further object of the invention is to provide a method for tolerance trimming workpieces which is extremely flexible and permits maneuverability around workpieces of complex configuration.

Still another object of the invention is the provision of a method for tolerance trimming and piercing workpieces which represents a great saving in cost as compared to the cost of prior art automatic trimming and piercing dies.

A still further object of the invention is to provide new and novel apparatus for carrying out the method of the present invention which is quite simple and inexpensive in construction, and yet which is efficient and reliable in operation.

A still further object of the invention is the provision of new and novel tools for use in carrying out certain steps in the method of the present invention.

Other objects and many attendant advantages of the invention will become more apparent when considered in connection with the specification and accompanying drawings, wherein:

FIG. 1 is a top view of a typical sheet of material as it comes from a stamping press where the material has been drawn to define therein the shape of the workpiece;

FIG. 2 represents the sheet of material as seen in FIG. 1, after having been rough cut;

FIG. 3 represents the sheet of material after it has been trimmed and pierced in conjunction with the trimming and piercing fixture of the invention;

FIG. 4 is a perspective view of the finished workpiece illustrating the multiple curvature thereof, the trimming of which creates special problems which are solved by the present invention;

FIG. 5 is another perspective view of the workpiece taken from a different angle;

FIG. 6 is a top perspective view of the trimming and piercing fixture of the present invention with the workpiece clamped therein;

FIG. 7 is an elevation partially broken away of the fixture as seen in FIG. 6;

FIG. 10 is a top perspective view showing the supporting framework and first fixture portion of the trimming and piercing fixture;

FIG. 11 is a bottom perspective view of the second fixture portion of the trimming and piercing fixture;

FIG. 14 is a sectional view taken substantially along line 14—14 of FIG. 9 looking in the direction of the arrows;

FIG. 15 is a top perspective view illustrating the manner in which the overstock is trimmed off by moving a cutting tool along the trimming edge portions of the fixture;

FIG. 16 is a sectional view taken substantially along line 16—16 of FIG. 15 looking in the direction of the arrows;

FIG. 17 is a top perspective view illustrating the manner in which a corner cutting tool is employed in the present invention;

FIG. 18 is an elevation of a power driven manually operable tool having a cutting member associated therewith;

FIG. 19 is an elevation of the cutting member shown in FIG. 18;

FIG. 20 is an elevation of a corner cutting member employed in the present invention;

FIG. 21 is a side view of the member shown in FIG. 20;

FIG. 22 is an end view of the member shown in FIG. 21;

FIG. 23 is an elevation of a piercing member employed with the power driven means; and FIG. 24 is an end view of the piercing member shown in FIG. 23.

Figure 8:
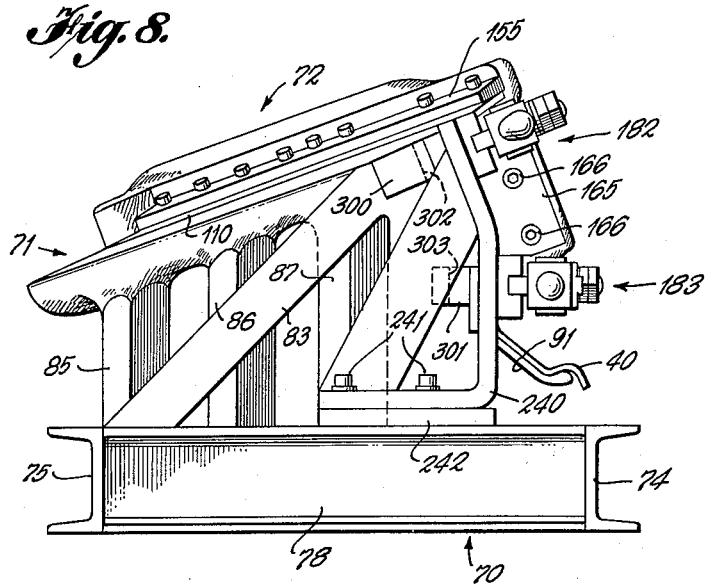
FIG. 8 is an end view taken from the right-hand portion of FIG. 7.

Referring now to the drawings wherein like reference characters designate corresponding parts throughout the several views, there is shown in FIG. 1 a typical workpiece indicated generally by reference numeral 30, which may for example be formed of a suitable metallic substance such as body steel. The workpiece shown is illustrative of the compound curvature found in workpieces to which the instant invention is particularly applicable.

As seen in FIG. 1, the outline of the sheet of material 30 is irregular, and draw bead portions 31, 32 and 33 extend around peripheral portions thereof, these draw beads being formed during the stamping operation which produces the desired finished configuration.

The finished workpiece lies in the central portion of the sheet of material as indicated generally by reference numeral 35. The dot-dash line 36 indicates the lines along which the member may be rough cut so as to remove large excess portions of the overstock whereby the sheet of material may be more readily clamped in the trimming and piercing fixture hereinafter described.

After the sheet of material has been stamped into the configuration shown in FIG. 1, the contour of the finished workpiece may be roughly marked on the material as a guide to assist a person in roughly cutting off the large excess portions of overstock.

For example, by use of a suitable template, the rough line of the finished workpiece may be roughly drawn in crayon on the sheet of material shown in FIG. 1. The sheet of material as shown in FIG. 1 is then cut by means of a band saw or other suitable means into the shape shown for example in FIG. 2. The sheet of material is of course cut outside of the rough line drawn on the workpiece such that the rough cut workpiece can then be subsequently trimmed to tolerance. In the configuration shown in FIG. 2, a large portion of the overstock has already been cut off, but the cut lines do not closely approach the finally finished outer dimension of the workpiece.

After the material has been cut to the shape shown in FIG. 2, it can be readily inserted in the fixture as will hereinafter appear. Dot-dash line 38 indicates in FIG. 2 the lines along which the sheet of material is finally trimmed to its desired finished outer dimension.

FIG. 3 illustrates the sheet of material after it has been trimmed and pierced in the trimming and piercing fixture of the present invention, it being noted that an elongated portion of overstock 40 in this particular example still extends along one side of the finished workpiece portion 35. It should be understood at this point that the present invention may be utilized for trimming a workpiece along all of its edges, or along a portion of its edges as the case may be. In the present example, certain edge portions of the workpiece are trimmed in the trimming and piercing fixture, while other portions may be trimmed in a different manner. It so happens that the overstock portion 40 may be readily trimmed with a large shearing blade since this portion can be separated from the workpiece along a single substantially straight line. It should be understood that portion 40 could be trimmed off along trimming edge portions of the fixture, but it is considered a simpler matter to trim off portion 40 with a shearing blade as above mentioned.

FIGS. 4 and 5 illustrate the finished workpiece which is indicated by reference numeral 35. The longitudinally extending edge 41 is that which is finally formed by trimming with a shearing blade, while edges 42, 43, 44 and 45 are formed with a cutting tool in conjunction with the trimming fixture.

The finished workpiece is provided with four lug portions 47, 48, 49 and 50, which extend longitudinally of the workpiece. Due to the manufacturing procedure involved in forming the finished article of which this workpiece is a part, the outer ends of lugs 47–50 need not be trimmed to tolerance and it is only necessary to ensure that the edge portions 41–45 are actually trimmed to tolerance. The lugs 47, 48, 49 and 50 are provided with pierced openings 51, 52, 53 and 54 respectively, which are in this case provided for the sole purpose of assisting in the aligning of the various elements preparatory to finally seam welding them. It is necessary that these holes be properly oriented in each of the lugs, and accordingly, the present invention provides a means for ensuring that these openings are in the exact proper position.

It will be noted that the workpiece is of a rather complex curvature and that the end portion 60 thereof is arcuate in cross-section while the end portion 61 thereof is relatively straight and extends substantially normally to the end portion 60. The longitudinally extending lip portion 63 of the workpiece curves upwardly out of the plane of the adjacent top portion of the workpiece as seen in FIG. 5, and it is apparent that the various portions of the workpiece have a substantial curvature and a complex relationship to one another.

Referring now to FIGS. 6–11 of the drawings, the construction of the trimming and piercing fixture is illustrated, and it will be seen that the fixture basically includes a supporting framework indicated generally by reference numeral 70 to which is fixedly secured a first lower fixture portion or nest 71, and also there is provided a removable second upper fixture portion or hold-down piece 72. The supporting framework 70 is of heavy-duty construction and may be formed of steel or similar material and includes a pair of longitudinally extending channel members 74 and 75 interconnected at one end by a pair of cross channel members 76 and 77 and interconnected at the opposite end by a pair of cross channels 78 and 79.

One end portion of the first fixture portion 71 is mounted upon an upwardly extending cross member including downwardly projecting leg portions 80 and 81. The opposite end portion of the first fixture portion 71 is supported by an upwardly laterally extending member 83 connected with the lower portion of the framework. In addition, longitudinally spaced portions of the first fixture portion 71 are supported by upwardly projecting support members 85, 86 and 87 extending upwardly from a suitable laterally extending channel member (not shown) which extends between channel members 75 and 79.

The construction of both the first and second fixture portions is similar in that the main body portions thereof may be formed of a plastic such as an epoxy resin or other suitable materials. Typical of the plastic which is suitable is that manufactured under the name "Nalcolite" by the National Lead Company, of New York, New York. The trimming edge portions of each of the first and second fixture portions are formed of a suitable metallic substance such as tool steel which is readily adapted to withstand the heavy abuse encountered by contact with the cutting tool hereinafter described.

It should be remembered in all of the following discussion that the main plastic body portions and the trimming edge portions are dimensioned such that the outer surfaces of the metallic trimming edge portions represent the outer finished dimension of the workpiece to tolerance, and accordingly, when the sheet of material is trimmed such that it is flush with these trimming edge portions, these outer edge portions so trimmed will be to tolerance.

As seen especially in FIG. 10, the main body portion 90 of the first fixture portion 71 is formed primarily of plastic as described above, and the upper surface which is visible in FIG. 10 is such that it is complementary to one surface of the finished workpiece. Accordingly, after the sheet of material has been stamped to its initial desired configuration, one surface of the sheet of material will snugly fit upon the upper surface of the first fixture portion as seen in FIG. 10.

The surface portion 91 as seen in FIG. 10 will receive the overstock portion 40 as shown in FIG. 3 of the drawings.

A trimming edge member 93 is removably attached to one end portion of the first fixture portion 71 by three screws 94. A clamping member 95 is fixed to the first fixture portion and extends longitudinally thereof, this clamping member also being formed of hard tool steel or similar material as are the remainder of the clamping members hereinafter described.

Clamping member 95 has machined therein an aligning hole 96 and a piercing hole 97.

A clamping member 100 is also secured to the first fixture portion and has an aligning opening 101 machined therein as well as a piercing guide hole opening 102.

It will be noted that a first bracing member 103 serves to brace clamping member 95 while another bracing member 104 serves to brace clamping member 100 such that these clamping members are adapted to readily withstand the clamping forces applied thereagainst. Each of these brace members is spaced from the under surface of the piercing opening of the associated clamping member to permit slugs of material pierced from the workpieces to fall out of the bottom of the piercing openings.

The clearance space 105 of brace member 104 is clearly seen in the drawings and a similar clearance space which is hidden from view is provided in bracing member 103 for the piercing opening 97. Referring to the broken-away portion at the upper left-hand part of FIG. 7, it will be seen that clamping member 100 includes a lateral surface 106 which represents a trimming edge portion which is flush with the outer surface of trimming edge member 107 immediately adjacent thereto, member 107 being removably attached to the first fixture portion 71 by bolts 108.

The righthand-most corner of member 107 abuts against trimming edge member 110 which it will be seen extends obliquely to member 107 and is removably secured in place on the first fixture portion 71 by a plurality of bolts 111. Trimming edge member 110 may be divided into three portions, as shown, for facilitating assembly and handling thereof. The outer end of trimming edge member 110 abuts against and the outer surface thereof is flush with the outer surface of a clamping member 115 secured to the first fixture portion.

As seen most clearly in FIG. 10, clamping member 115 is provided with an aligning opening 116 and a piercing opening 117. A trimming edge member 118 extends along the far end of the fixture portion 71 as seen in FIG. 10 and is detachably secured thereto by a plurality of bolts (not shown). Another clamping member 120 is fixed to fixture portion 71 and has its outer surface flush with and abutting against trimming edge member 118 as seen in FIG. 10. Clamping member 120 is provided with an aligning opening 121 and a piercing guide hole opening 122.

As seen particularly in FIG. 10, and broken-away in FIG. 7, an aligning portion 125 is supported from channel member 75 of the supporting framework, the upper portion of aligning member 125 being configured such that it is complementary to and snugly receives the under surface of portion 126 of the sheet of material as seen in FIG. 2. The cooperation between aligning portion 125 portion is properly aligned when the sheet of material is such that the sheet of material on the first fixture portion is properly aligned when then sheet of material is initially positioned in the trimming and piercing fixture. Once the sheet of material has been so properly positioned, it can then be readily clamped between the two portions of the trimming fixture as will hereinafter be more fully described. It should be noted that aligning portion 125 is spaced from the adjacent member 107 and surface 106 of the clamping member 100 such that overstock may be trimmed away by inserting the tool in such clearance space.

Referring now particularly to FIG. 11, the second fixture portion is illustrated, the second fixture portion having the under surface 130 thereof, which is formed principally of plastic as aforedescribed, configured so as to be complementary to and snugly fit the opposite side of the sheet of material from the surface 90 on the first fixture portion. A pair of openings 131 and 132 are provided through the central portion of the second fixture portion for the purpose of lightening this portion.

The second fixture portion must be readily removable from the first fixture portion for inserting workpieces therebetween and for this purpose a hole 133 as seen in FIG. 7 is provided for receiving a rope or cable 134 as seen in FIG. 11 which may be connected with a suitable counterweight over a pulley or any suitable arrangement may be provided for enabling a person to readily lift and lower the second fixture portion when desired.

Figure 9:
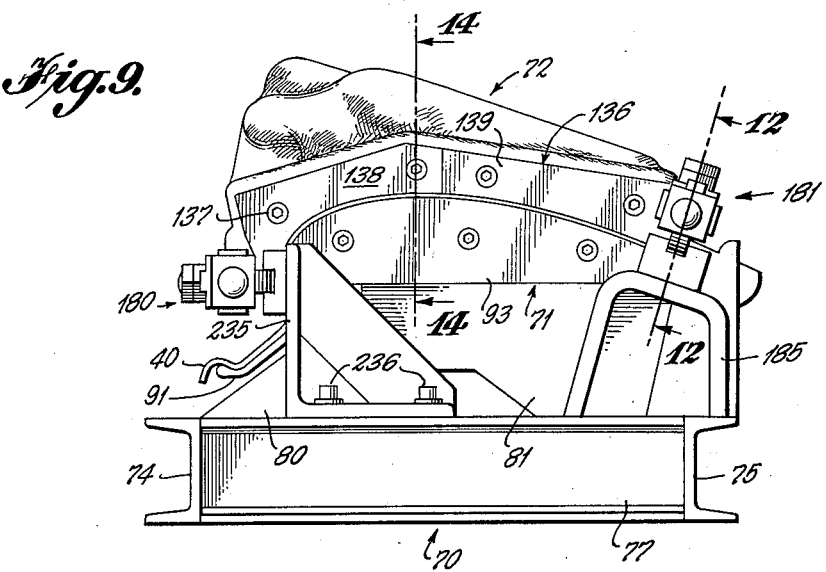
FIG. 9 is an end view taken from the left-hand portion of FIG. 7.

A trimming edge member 136 is fixed to one end portion of the second fixture portion and is removably secured thereto by means of bolts which are hidden from view in FIG. 11, but which are clearly visible in FIG. 9, and have the reference numerals 137 applied thereto. As seen in FIG. 9, the trimming edge member 136 may be divided into two portions 138, 139 for facilitating assembly and handling thereof.

Referring again to FIG. 11, clamping members 140 and 141 abut the opposite ends of trimming edge member 136 and are secured to the plastic main body portion of the second fixture portion. Clamping member 140 is provided with an aligning hole 143 and a guide for piercing hole 144 while clamping member 141 is provided with an aligning hole 146 and a guide for piercing hole 147.

A trimming edge member 150 is detachably secured to the main body portion 130 by bolts 151, the outer face of trimming edge member 150 being flush with the outer face of clamping member 140.

An elongated tapered trimming edge member 155 abuts trimming edge member 150 at one end thereof and is detachably secured in position by a plurality of bolts 157 as seen in FIG. 7, these bolts extending through suitable openings provided in a plate 158 embedded in the main plastic body portion of the second fixture portion.

A clamping member 160 abuts the opposite end of trimming edge member 155, the clamping member 160 having an aligning opening 161 formed therein and a guide for piercing opening 162 formed therein.

A trimming edge member 165 extends along the end portion of the second fixture portion and is detachably secured thereto by means of bolts 166 as seen in FIG. 8. Trimming edge member 165 abuts at one end against clamping member 160 and at its opposite end against clamping member 167 which is secured to the main plastic body portion 130 as is clamping member 160. Clamping member 167 has an aligning opening 168 formed therein and a guide for piercing opening 169 formed therein.

A better understanding of the particular construction of the first and second fixture portions and the mode in which the trimming edge members are secured thereto may be obtained from an inspection of FIGS. 14 and 16 which illustrate cross-sections through these fixture portions.

Referring firstly to FIG. 14, which is a section through one end of each of the fixture portions, it will be seen that the main body portions 89 and 130 of the first and second fixture portions respectively are formed of plastic as aforedescribed. This plastic may also preferably be reinforced with fiberglass or a similar material to increase the strength thereof. In order to detachably secure the trimming edge members in place, bolts are provided which must be anchored in a suitable member, the plastic not being suitable for receiving these threaded bolts. Accordingly, anchoring plates 170 and 171 are embedded in the plastic body portions 89 and 130, these anchoring plates having suitable threaded openings for receiving the threaded bolts 94 and 137. These anchoring plates are formed of a suitable metallic material such as a metal or metal alloy. For example, a metallic material sold under the name "Kirksite" manufactured by the National Lead Company, of New York, New York may be employed for this purpose.

FIG. 14, of course, illustrates the first and second fixture portions in operative relationship with respect to one another with the sheet 30 clamped therebetween and the overstock portion extending out beyond the trimming edge members which, of course, represent the finished outer dimension of the workpiece.

Referring now to FIG. 16, which is a section through the device shown in FIG. 15, it will be seen than an anchoring plate 175 similar to anchoring plates 170 and 171 is embedded within the plastic main body portion 89 of the first fixture portion, and is positioned immediately below the trimming edge member 110. Anchoring plate 175 is, of course, provided with a plurality of suitable threaded openings for receiving threaded bolts 111. It will be evident, of course, that in each case the various trimming edge members have countersunk openings therein for receiving the flat headed bolts associated therewith such that the bolts will not project beyond the outer surface of the trimming edge members.

Also as seen in FIG. 16, it will be noted that plate 158 is embedded in the plastic main body portion 130 of the second fixture portion and that bolts 157 extend through this plate and into the removable plate 155.

It will be understood that in both the first and second fixture portions, the trimming edge members are held in place by means of the associated bolts which extend into suitable anchoring plates which are embedded in the main plastic body portions. The advantage of this arrangement lies in the fact that the trimming edge members can be readily removed after a certain amount of wear has occurred, and then can be reground, shimmed and then put back in place on the respective fixture portions. In this manner, the same trimming edge members can be used again and again thereby resulting in a very economical operation even after considerable wear has occurred on the trimming edge members.

It will be noted that there are provided four clamping members on both the first and second fixture portions, and these clamping members cooperate with four suitable clamping means hereinafter described which serve to effectively clamp the fixture portions to one another with the sheet of material sandwiched therebetween. It is apparent that the number of clamping members and clamping means associated therewith may be varied in accordance with the size and configuration of the workpiece, and the four clamping means as shown herein are illustrative only.

FIGS. 6, 7, 8 and 9 illustrate the apparatus in clamped position, and it will be seen that the clamping members 95, 100, 115 and 120 of the first fixture portion are disposed immediately adjacent to and beneath the clamping portions 141, 140, 160 and 167 respectively of the second fixture portion. The clamping means for so clamping these pairs of clamping members in position are indicated generally by reference numerals 180, 181, 182, and 183 respectively. A detailed description of one of these clamping arrangements will suffice for each of them since they are of similar construction and operate in a similar manner.

Figure 12:
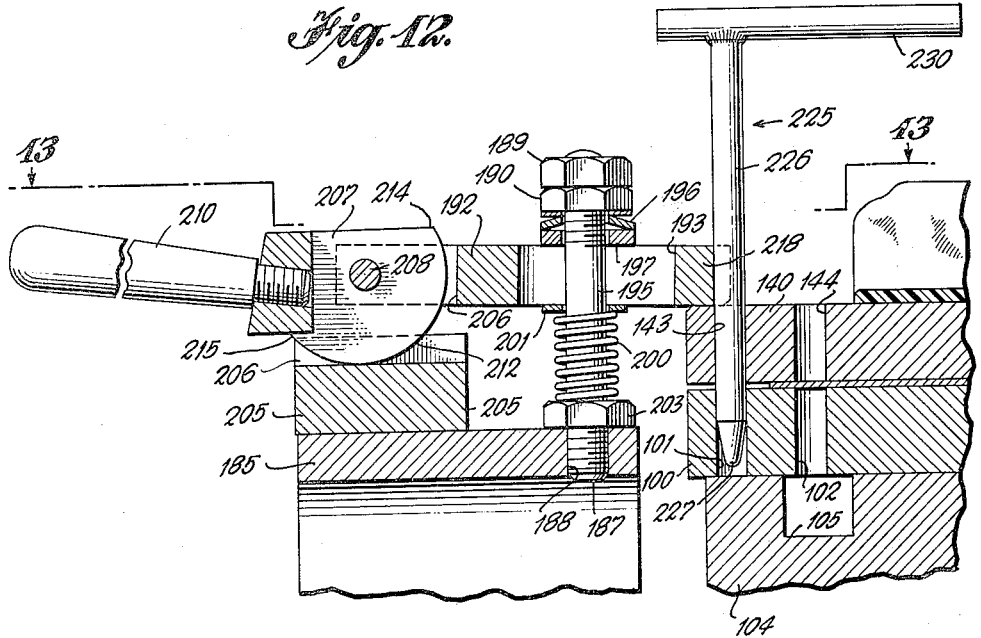
FIG. 12 is a sectional view taken substantially along line 12—12 of FIG. 9 looking in the direction of the arrows.

Referring to FIG. 12, the clamping means is supported upon a yoke member 185 which as seen clearly in FIGS. 6 and 9 extends upwardly from the cross frame members 76 and 77 of the supporting framework. A bolt 187 is threaded within a threaded opening 188 formed in yoke 185 and has a pair of nuts 189 and 190 threaded onto the opposite end thereof.

An elongated arm 192 has an elongated slot 193 formed therein which receives the shank portion 195 of the bolt. A spring washer 196 bears against a washer 197 which is seated on the upper surface of arm 192 on opposite sides of slot 193.

A compression spring 200 is seated at its upper end on a washer 201 which bears on the under surface of arm 192 on opposite sides of slot 193. The lower end of spring 200 is seated against a nut 203 threaded on the lower threaded end of bolt 187.

A supporting plate 205 is rigidly attached to the upper portion of yoke 185 as by welding and the like and is provided with an elongated slot 206 which receives a cam member 207. Cam member 207 is pivotally secured to arm 192 by a pin 208, and a handle portion 210 extends laterally of the cam member. The portion of the cam 207 which is received in slot 206 of member 192 has an arcuate outer cam surface 212 formed thereon, this surface being formed as a portion of a circle which is eccentric to the pivot axis of pivot pin 208. The arrangement is such that the distance from the pivot axis to point 214 on the cam is the least distance from the pivot axis to the cam surface while the distance increases gradually in a counterclockwise direction to point 215 which is spaced the greatest distance from the pivot axis.

The mode of operation of the clamping means will be apparent in that once the nuts 189 and 190 have been properly adjusted so that the clamping end 218 of arm 192 will fit over the adjacent clamping member of the second fixture portion, rotation of the handle 210 and its associated cam member will cause the arm 192 to be rotated such that the clamping end thereof will be moved downwardly about the fulcrum of washer 197 to urge the clamping member of the second fixture portion toward the clamping member of the first fixture portion.

Figure 13:
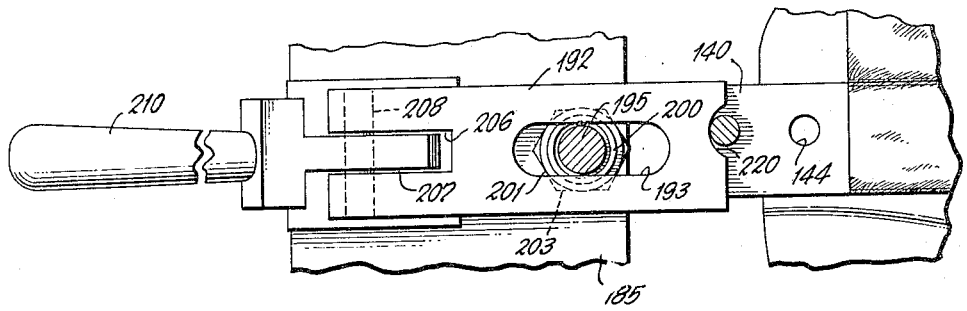
FIG. 13 is a sectional view taken along line 13—13 of FIG. 12 looking in the direction of the arrows.

It will also be noted as seen in FIG. 13 that the outer end of arm 192 is cut away to provide an arcuate cut-out 220 which is for the purpose of providing clearance for the aligning pin hereinafter described.

In order to ensure that the first and second fixture portions are accurately aligned, the previously described aligning holes provided in the clamping members of the fixture portions are employed. As seen in FIG. 12, an aligning pin indicated generally by reference numeral 225 is provided with a first leg portion 226 which is adapted to be snugly received within the aligning openings 143 and 101 of the clamping members 140 and 100 respectively, the lower end portion 227 of leg portion 226 being tapered so as to facilitate entry of the aligning pin. A normally extending leg portion 230 is provided at the opposite end of leg portion 226 for permitting the pin to be readily manually handled.

Before the clamping means are actuated by rotating the handles thereof into the clamping position shown in FIG. 6, the various aligning pins 225 of similar construction are positioned within the aligning openings of the adjacent clamping members. Once these aligning pins have been so positioned, the various pivotable arm portions of the different clamping means may be moved into position and urged into clamped position.

The clamping means 180, 182 and 183 are identical with clamping means 181 with the exception that the lowermost nut of each of clamping means 180, 182 and 183 corresponding to the lowermost nut 203 of the clamping means 181 is disposed on the opposite side of the supporting member from the spring corresponding to spring 200 in each of clamping means 180, 182 and 183; otherwise the various clamping means are of identical construction and mode of operation.

As seen most clearly in FIG. 9, clamping means 180 is mounted upon an angle bracket 235 which is secured by bolts 236 on the cross frame members 76 and 77 of the supporting framework. As seen most clearly in FIG. 8, clamping means 182 and 183 are supported upon an angle bracket 240 secured by bolts 241 to a plate 242 which is welded between cross frame members 78 and 79.

Referring no wto FIGS. 18–24, various tools employed with the present invention are illustrated. Each of these tools is used in conjunction with an air gun as seen in FIG. 18 indicated generally by reference numeral 250, the air gun having a trigger 251 and a nipple 252 which is connected to a suitable line 253 connected with a source of air or other suitable gas pressure.

A suitable gun for the purpose of the present invention is a conventional riveter, generally used for aircraft riveting and identified as CP-4X manufactured by the Chicago Pneumatic Co., of New York, New York. This type of gun delivers controlled, slow and relatively heavy blows.

In place of a riveter attachment, the present invention utilizes a safety retainer 255 as shown in U.S. Patent No. 2,453,536. With this retainer the various working members of the tool may be employed.

As shown in FIGS. 18 and 19, a cutting member 260 illustrated, this cutting member having a substantially cylindrical shank portion 261 with longitudinally extending grooves 262 therein for reception in the safety retainer 255, the upper end portion 263 of member 260 being of reduced diameter.

This cutting member 260 is substantially chisel-shaped having a flat blade portion 265 at the lower end thereof which is ground away to provide a sharp cutting edge 266 at the lowermost portion thereof as seen in the drawings. The cutting edge 266 is formed substantially along the longitudinal axis of the cutting member and extends laterally thereof as will be apparent. Member 260 will, of course, be formed of a heavy-duty metallic construction and the sharp cutting edge 266 thereof is adapted to readily cut through the material of the workpiece. The manner of utilizing the cutting tool is illustrated in FIG. 15 wherein it is seen that the cutting member 260 is being moved along the adjacent surfaces of trimming edge members 110 and 155.

It will be noted that the person carrying out the process grips the handle portion of the gun with one hand and the body portion of the gun with the other hand for guiding the tool along the trimming edge members. All that is necessary is to maintain the cutting edge of the chisel in contact with the trimming edge members by pressing the tool toward the trimming edge members while keeping the tool suitably inclined so that it is operating at an efficient cutting angle as shown. The person will continue to move the tool around the various adjacent cutting edges of the first and second fixture portions to trim off all of the overstock extending outwardly of the trimming edge members.

A particularly desirable feature is the fact that the portion 268 of the overstock which has been cut away as seen in FIG. 15 will have a natural tendency to curl up as shown. This is desirable since the material will thereby tend to move away from the tool such that further cutting is facilitated.

Referring now to FIGS. 20, 21 and 22, a corner cutting member to be employed with the gun 250 is shown, member 270 having a main substantially cylindrical body portion with longitudinally extending grooves 271 formed therein and having an upper portion 272 of reduced diameter. The lower end 275 of member 270 lies in a plane, this plane extending obliquely to the longitudinal axis of member 270, and as seen most clearly in FIGS. 21 and 22, this end portion is provided with adjacent side edges 277 and 278 which intersect one another at point 280 to define a corner. These adjacent edge portions may extend substantially normally to one another in the case where it is desired to cut out a substantially square corner. It is apparent that these edges may be disposed at the desired angle in accordance with the desired angularity of the cut to be made. Flat portions 281 are formed in the cylindrical wall of the member so as to form the straight edge portions at the lower end of the member.

The mode of utilizing the corner cutting tool shown in FIGS. 20–22 is illustrated in FIG. 17. As seen in this figure, an overstock portion 285 extends out beyond the trimming edge members 136 and 93 and also extends beyond the adjacent side faces of clamping members 100 and 140. It is desired to form a corner cut through the overstock along the adjacent edges of the clamping members and the outer surfaces of the trimming edge members.

The corner cutting member 270 is therefore positioned as shown in FIG. 17 with the edge 277 thereof abutting trimming edge member 136 and the edge 278 thereof abutting the inner surface of clamping member 140. It will be noted that the inclination of the end surface of the trimming member will cause the tool to have a natural inclination as shown since surface 275 at the end of member 270 is positioned flat upon the adjacent overstock portion.

Upon application of power to the pneumatically driven gun, member 270 will be driven downwardly and the sharp edge portions 277, 278 will serve as cutting edges and an L-shaped cut will be made in the overstock in the desired place.

It is apparent that other configurations may be provided for cutting out other odd shapes, and the cutting end of the cutting member may have arcuate or other configurations as desired.

Referring now to FIGS. 23 and 24 of the drawings, a piercing means is illustrated which is also adapted to be associated with the power driven gun 250. The piercing means includes a main cylindrical body portion 290 having longitudinally extending grooves 291 formed in the upper surface thereof. A reduced end portion 292 is provided at the upper end of the piercing means and a reduced end portion 293 is provided at the lower end thereof. Portion 293 is provided with an outer diameter equal to that of the hole which it is desired to punch in the workpiece, and portion 293 will be snugly received within the piercing openings provided in the clamping members of the fixture portions.

A sleeve 295 is provided around reduced portion 293 and a collar 296 is fixed to reduced portion 293. A compression spring 297 is secured at its upper end to sleeve 295, the compression spring surrounding reduced portion 293 and serving as a stripper spring in a well-known manner.

When it is desired to pierce the openings in the workpiece, the lower reduced end portion 293 of the piercing means is inserted through the piercing opening in the clamping member of the second or upper fixture portion. For example, as seen in FIG. 12, this reduced end portion 293 would be inserted within hole 144. Upon the application of power to the tool, the lower end portion 293 of the piercing means will punch out a circular slug from the workpiece, and the lower reduced portion 293 of the piercing means will partially enter the openings 102 in the clamping means on the first or lower fixture portion. The slug removed from the workpiece will drop out of the piercing opening formed in the clamping means of the first fixture portion.

The stripper spring 297 will serve to return the lower reduced portion 293 of the piercing means out of the hole formed in the workpiece whereupon the piercing means will be completely withdrawn.

It is apparent that this piercing operation can be carried out at each of the four locations shown in a similar manner.

Instead of merely providing piercing openings in the clamping members, replaceable bushings may be mounted within the clamping members such that the size of the piercing openings can be readily varied by changing the die inserts as desired.

As seen in FIG. 8, a first bracing member 300 abuts clamping member 115 and a second bracing member 301 abuts clamping member 120, these bracing members serving to reinforce the clamping members so that they can withstand the loading applied thereto by the clamping means.

Small clearance openings 302 and 303 are provided through bracing members 300 and 301 respectively for permitting the punched-out slugs of the workpiece to leave the piercing openings provided in the respective clamping members.

Summarizing the method of the present invention, a sheet of material is first formed in a press to provide the desired shape with a certain amount of overstock extending laterally beyond the desired finished dimensions of the workpiece. The sheet of material then may be roughly marked to indicate the outer contour of the finished workpiece. The sheet of material is then rough cut with a band saw or the like to remove large excess portions of the sheet of material such that it may be readily clamped between the portions of the trimming and piercing fixtures.

The rough cut sheet of material is then clamped in place within the fixture by first aligning the sheet of material with the first fixture portion by means of aligning portion 125, and then aligning the second fixture portion with the first fixture portion by means of the aligning pins, and finally actuating the clamping means.

The cutting tool is then employed for cutting off the overstock projecting beyond the trimming edge portions of the fixture, the corner cutting tool being used where appropriate. The piercing means are then employed for piercing the holes in the trimmed workpiece, and the workpiece is then removed from the fixture.

Any burrs or other small projections which may be present on the trimmed edges are then removed with the use of a wire brush or wheel which provides a smooth trimmed edge in all cases.

The next step in the method according to the present invention is trimming off the overstock to provide the edge 41 as discussed in connection with FIGS. 4 and 5 of the drawings. This is accomplished as discussed previously by shearing this portion off with a single straight shear blade. The outer ends of the four lugs 47-50 of the workpiece may then be trimmed or ground off to provide a smooth edge, this not being a critical dimension, and accordingly, this final trimming of the lugs does not have to be to tolerance.

It is evident that in the construction of the trimming and piercing fixture, the entire fixture may be formed of metal or other material if desired, but it is considered simpler and more economical to form the main part of the fixture portion of plastic or similar material while forming only the trimming edge portions of tool steel and the like.

In order to afford greater versatility and to enable ready access to the various portions of the fixture, as well as the sheet of material clamped therein, the entire fixture may also be mounted upon trunnions which can be connected to the supporting framework at opposite ends thereof whereby the entire trimming and piercing fixture may be rotated and inverted when desired.

It is apparent from the foregoing that there is provided a new and novel method and apparatus for tolerance trimming and piercing workpieces where overstock is presented after a stamping operation and wherein in particular the workpiece is provided with compound curvatures and complex shapes.

The method for tolerance trimming and piercing workpieces can be carried out in a much simpler and more efficient manner than prior art manual methods, and the method of the present invention is fool-proof since it is not possible for personnel to cut off an excess amount of material due to the fact that the cutting tool moves along the trimming edge portions of the fixture and can not cut beyond these edge portions.

Furthermore, the carrying-out of the method according to the present invention does not require highly skilled labor. The foolproof method of carrying out the present invention results in a susbtantial saving in both material and labor as compared to prior art manual methods, and the method of the present invention is extremely flexible and adaptable since it permits manual maneuverability around workpieces of very complex configurations. The cost of constructing the trimming and piercing fixtures of the present invention is only a fraction of that required for making automatic trimming and piercing dies as is commonly used in high production runs and accordingly the present invention provides a substantial saving in cost over this type of operation.

The apparatus provided for carrying out the present invention is quite simple and inexpensive in construction, and yet is quite efficient and reliable in use. New and novel tools for carrying out certain steps in the method of the present invention are also provided, these tools functioning in cooperation with the trimming and piercing fixtures to provide the advantages aforediscussed.

As this invention may be embodied in several forms without departing from the spirit or essential characteristics thereof, the present embodiment is therefore illustrative and not restrictive, and since the scope of the invention is defined by the appended claims, all changes that fall within the metes and bounds of the claims or that form their functional as well as conjointly cooperative equivalents are therefore intended to be embraced by those claims.

I claim:
1. Apparatus for tolerance trimming and piercing workpieces comprising a supporting framework, a first fixture portion fixed to said framework and including a portion contoured complementary to one portion of a workpiece, a second movable fixture portion having a portion contoured complementary to another portion of the workpiece, each of said fixture portions having trimming edge portions thereon defining portions of the desired finished outer dimensions of the workpiece to tolerance, an aligning portion supported by said framework and contoured so as to engage a portion of the workpiece to properly align the workpiece on the first fixture portion, and clamping means for clamping a workpiece between the two fixture portions, said clamping means including clamping portions extending outwardly of said trimming edges from each fixture portion and spaced from the trimming edges so as to enable access to all portions of the trimming edges where trimming is to be performed, and means for urging said clamping portions toward one another, each of said fixture portions including clamping portions, some of said clamping portions being engageable with said clamping means, said clamping portions having aligned openings formed therethrough for the reception of pins for properly aligning the two fixture portions with respect to one another.

2. Apparatus for tolerance trimming and piercing workpieces comprising a rigid supporting framework, a first fixture portion fixed to said framework and having a portion thereof contoured complementary to one portion of a workpiece, a removable fixture portion separated from said first fixture portion and being provided with a portion contoured complementary to another portion of the workpiece, each of said fixture portions having laterally extending clamping portions, said clamping portions having a first set of aligned openings for receiving aligning pins and having a second set of aligned openings for receiving a piercing tool for piercing the workpiece, an aligning portion supported by said framework and being contoured to fit a portion of the workpiece for properly aligning the workpiece on the first fixture portion, and clamping means supported by said framework, said clamping means including a pivotally mounted member adapted to engage the clamping portions on said second fixture portion for tightly clamping a workpiece between said fixture portions.

3. The method of tolerance trimming workpieces comprising forming a workpiece of compound curvature in a piece of sheet metal material such that overstock extends laterally outwardly from outer portions of said workpiece, providing a trimming fixture having at least one pair of separate trimming edge portions thereon defining substantial portions of the desired finished outer dimension of the workpiece to tolerance, placing the workpiece with the overstock thereon in the fixture and clamping outer portions of said workpiece between first surfaces of said edge portions which clampingly contact opposite sides of the workpiece substantially continuously along such first surfaces, second outwardly facing surfaces of said edge portions lying substantially in a plane, and removing the overstock projecting beyond said second surfaces by manually manipulating separate portable tool means having a cutting portion thereon and moving said cutting portion along said second surfaces to cut the overstock from the workpiece.

4. The method as defined in claim 3 including the additional step of rough cutting the sheet metal material after the workpiece is formed therein to remove large excess portions so that the sheet metal material may then be readily placed in the fixture.

5. The method as defined in claim 3 including the additional steps of removing the workpiece from the fixture and then cutting off certain portions of the overstock with a different cutting means.

6. The method as defined in claim 3 including the additional steps of providing holes in the trimming fixture for guiding a piercing tool, providing a piercing tool, and inserting a portion of the piercing tool through certain holes of the fixture for piercing a hole in the workpiece in a desired location while the workpiece is clamped within the fixture.

7. Apparatus for tolerance trimming workpieces of a compound curvature formed in sheet metal material and having overstock extending laterally outwardly from outer portions of the workpieces comprising a first fixture portion and a second fixture portion, said first and second fixture portions each being contoured complementary to a portion of a workpiece and being engageable with opposite sides of a workpiece to clamp the workpiece therebetween, each of said fixture portions being provided with at least one pair of separate trimming edge portions defining portions of the desired finished outer dimension of the workpiece to tolerance, means for clamping the two fixture portions to one another with said one pair of trimming edge portions adjacent one another, said edge portions having first surfaces thereof disposed in spaced relationship to one another and adapted to clampingly contact opposite sides of a workpiece substantially continuously along said first surfaces, said edge portions including second outwardly facing surfaces lying substantially in a plane for guiding a manually manipulatable tool along such outwardly facing surfaces, said clamping means including clamping portions extending outwardly of said trimming edge portions from each fixture portion and spaced from said trimming edge portions so as to enable access to all parts of the trimming edge portions where trimming is to be performed, and means for urging said clamping portions toward one another.

8. Apparatus as defined in claim 7, wherein said first and second fixture portions are provided with aligned openings formed therein for guiding a piercing tool utilized for piercing openings in a workpiece.

9. Apparatus as defined in claim 7 wherein said trimming edge portions are removably attached to said fixture portion such that the trimming edge portions may be removed and re-ground when necessary whereby the trimming edge portions may be utilized over long periods of time.

References Cited by the Examiner

UNITED STATES PATENTS

| | | | |
|---|---|---|---|
| 673,909 | 5/01 | Kimball | 269—87.1 |
| 712,843 | 11/02 | Paul | 30—277 |
| 1,008,940 | 11/11 | Best. | |
| 1,175,197 | 3/16 | Thomas | 83—34 |
| 1,680,467 | 8/28 | Matheson | 113—42 X |
| 1,726,180 | 8/29 | Habenicht et al. | 29—556 |
| 2,013,893 | 9/35 | Matthews | 83—455 |
| 2,040,364 | 5/36 | Dean | 83—34 |
| 2,369,425 | 2/45 | Becker | 269—87 |
| 2,559,434 | 7/51 | Hyland | 83—455 X |
| 2,624,408 | 1/53 | Stein | 83—455 X |
| 2,730,173 | 1/56 | Brescka | 83—565 X |
| 2,744,268 | 5/56 | Beart | 29—534 X |
| 3,003,237 | 10/61 | Chandler | 30—277 |

WHITMORE A. WILTZ, *Primary Examiner.*

CARL W. TOMLIN, *Examiner.*